US008412095B2

(12) United States Patent
Alkan (10) Patent No.: US 8,412,095 B2
(45) Date of Patent: Apr. 2, 2013

(54) APPARATUS FOR MINIMIZING AMPLIFIER OSCILLATION IN AN ANTENNA SYSTEM

(75) Inventor: Erdogan Alkan, Fayetteville, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 266 days.

(21) Appl. No.: 12/837,101

(22) Filed: Jul. 15, 2010

(65) Prior Publication Data

US 2012/0015611 A1    Jan. 19, 2012

(51) Int. Cl.
*H04B 1/10*    (2006.01)
(52) U.S. Cl. .................................. 455/24; 455/278.1
(58) Field of Classification Search ............ 455/24, 455/130, 272, 276.1, 277.1, 278.1, 279.1, 455/296, 303, 304, 307
See application file for complete search history.

(56) References Cited

U.S. PATENT DOCUMENTS

| | | | |
|---|---|---|---|
| 4,262,304 A | | 4/1981 | Faroudja |
| 4,972,346 A | | 11/1990 | Kawano et al. |
| 5,117,505 A | * | 5/1992 | Talwar ........................ 455/278.1 |
| 5,305,168 A | | 4/1994 | Lin et al. |
| 5,548,838 A | * | 8/1996 | Talwar et al. ................. 455/304 |
| 6,038,460 A | | 3/2000 | Aleiner |
| 6,348,802 B1 | | 2/2002 | Cooke |
| 6,847,803 B1 | * | 1/2005 | Rauhala et al. .............. 455/63.1 |
| D506,445 S | | 6/2005 | Mahoney |
| D512,382 S | | 12/2005 | Mahoney |
| 6,974,561 B1 | | 12/2005 | Thomason |
| D521,939 S | | 5/2006 | Mahoney |
| 7,123,676 B2 | | 10/2006 | Gebara et al. |
| 7,167,154 B2 | | 1/2007 | Sato et al. |
| 7,221,967 B2 | | 5/2007 | Van Buren et al. |
| 7,408,594 B2 | | 8/2008 | Nor |
| 7,409,186 B2 | | 8/2008 | Van Buren et al. |
| 7,440,496 B2 | | 10/2008 | Peek et al. |
| 7,471,175 B2 | | 12/2008 | Voss |
| 7,486,929 B2 | | 2/2009 | Van Buren et al. |
| 7,525,853 B2 | | 4/2009 | Kitazaki et al. |
| 7,554,828 B2 | | 6/2009 | Wilson |
| 2003/0174118 A1 | | 9/2003 | Sato et al. |
| 2005/0030884 A1 | | 2/2005 | Kim et al. |
| 2005/0068245 A1 | | 3/2005 | Chen |
| 2005/0285979 A1 | | 12/2005 | Tan et al. |
| 2006/0009179 A1 | | 1/2006 | Nor |
| 2006/0058071 A1 | | 3/2006 | Buren et al. |
| 2006/0058072 A1 | | 3/2006 | Buren et al. |
| 2006/0197834 A1 | | 9/2006 | Balanica |
| 2006/0209997 A1 | | 9/2006 | Van Buren et al. |

(Continued)

OTHER PUBLICATIONS

PCT/US2011/043563. International Search Report and Written Opinion. Date of Mailing: Feb. 9, 2012. 8 pages.

(Continued)

*Primary Examiner* — Thanh Le
(74) *Attorney, Agent, or Firm* — Schmeiser, Olsen & Watts LLP (57) ABSTRACT

Embodiments of an apparatus for minimizing oscillation of an amplifier in an antenna system are provided. These embodiments can comprise passive circuitry in the form of a coupling simulator that includes passive elements selected and combined to generate an output with properties that can cancel or substantially reduce a coupled input as between two antennas in the antenna system. In one example, the coupling simulator may include a phase-shifting device and an attenuating device, each of which have properties with values selected based on parameters that result from the relationship between the antennas of the antenna system.

16 Claims, 5 Drawing Sheets

U.S. PATENT DOCUMENTS

| | | |
|---|---|---|
| 2007/0030740 A1 | 2/2007 | Wada et al. |
| 2007/0035973 A1 | 2/2007 | Kitazaki et al. |
| 2007/0085597 A1 | 4/2007 | Okada et al. |
| 2007/0197207 A1 | 8/2007 | Carstens et al. |
| 2007/0218951 A1 | 9/2007 | Risheq et al. |
| 2008/0014862 A1 | 1/2008 | Van Buren et al. |
| 2008/0014863 A1 | 1/2008 | Van Buren et al. |
| 2008/0076358 A1 | 3/2008 | Van Buren et al. |
| 2008/0076437 A1 | 3/2008 | Wilson et al. |
| 2008/0098165 A1 | 4/2008 | Shinozaki et al. |
| 2008/0218323 A1 | 9/2008 | Lesesky et al. |
| 2008/0231233 A1 | 9/2008 | Thornton |
| 2008/0261519 A1 | 10/2008 | DeMarco et al. |
| 2009/0156118 A1 | 6/2009 | Schadler |
| 2009/0175096 A1 | 7/2009 | Kitazaki et al. |

OTHER PUBLICATIONS

US 7,088,332, 08/2006, Sato et al. (withdrawn).

* cited by examiner

FIG. 5

APPARATUS FOR MINIMIZING AMPLIFIER OSCILLATION IN AN ANTENNA SYSTEM

TECHNICAL FIELD

The present invention relates to antenna systems such as cell phone boosters, and more particularly to embodiments of an apparatus comprising passive elements selected for minimizing amplifier oscillation in the antenna system.

BACKGROUND

Cellular telephones and similar wireless communication technology use antenna systems to communicate signals between two points. For more effective exchange of signals, base stations are incorporated into these antenna systems. The base stations include antennas and other peripheral devices, all of which can extend the coverage of wireless service to a wider, more encompassing area. This equipment is still, however, limited in the amount of coverage that can be provided. Location, topography, and population concentration can all play a role in where and how the base stations are provided within the system.

These considerations impact the availability and quality of the signals that radiate from, e.g., the base stations. To further accommodate low signal levels, additional devices such as signal boosters can be employed locally in locations that require improved signal quality such as within individual homes and businesses. These signal boosters can comprise local antenna systems that include a boosting device that is located within the home to communicate via antenna with the cell phone. The boosting device can further include a second antenna, which is typically positioned on the exterior of the home and wirelessly coupled to the interior antenna of the boosting device. The antennas are often provided for exchanging signals with the service provider system, and for exchanging signals with the individual telephones and the base station.

Enhancements to these signal boosters may preclude the need for exterior antennas in favor of incorporating both of the transmit antenna (e.g., the antenna communicating with the cell service provider) and the receive antennas (e.g., the antenna communicating with the cell phone) into the boosting device. However, the close proximity of the antennas in the boosting device may cause coupling that can affect the stable function of the boosting device. In one example, the proximity can cause the inadvertent exchange of signals from one antenna to the other antenna within the signal booster system. Coupling is particularly detrimental to the performance of the signal booster because it can cause oscillation of the amplifier in the signal booster.

It is therefore advantageous to provide an apparatus such as a boosting device that is configured to prevent oscillation of the amplifier.

SUMMARY

There is described below in several embodiments an apparatus for preventing oscillation the amplifier in antenna systems. These apparatus can comprise passive circuitry and elements, which are useful for negating the effects of coupling that can occur as between the antenna in the antenna system.

In one embodiment, an apparatus for preventing oscillation of an amplifier by a coupled input between a first antenna and a second antenna in an antenna system, the amplifier generating an amplifier output. The apparatus comprises a coupling simulator coupled to the amplifier to receive the amplified output, the coupling simulator generating a coupling simulator output having properties varying from output properties of the amplifier output by a pre-determined phase effect and a pre-determined attenuation effect. The apparatus also comprises a combining device coupled to the coupling simulator to receive the coupling simulator output, the combining device generating an amplifier input comprising the coupling simulator output. In one example of the apparatus, a value for each of the pre-determined phase effect and the pre-determined attenuation effect are assigned based on system parameters that describe the relationship between the first antenna and the second antenna.

In another embodiment, an apparatus for canceling a coupled input occurring between a first antenna and a second antenna. The apparatus comprises an amplifier for generating an amplifier output, a coupling simulator coupled to the amplifier, the coupling simulator generating a coupling simulator output having properties inversely proportional to the coupled input, and a combining device for combining the coupling simulator output with an antenna input from one of the first antenna and the second antenna. In one example of the apparatus, the properties of the coupling simulator output are caused by an attenuating device for sampling the amplifier output and a phase shifting device coupled to the attenuating device. In another example of the apparatus, the attenuating device exhibits a pre-determined attenuating effect and the phase shifting device exhibits a pre-determined phase effect. In yet another example of the apparatus a value for each of the pre-determined phase effect and the pre-determined attenuation effect are assigned based on system parameters that describe the relationship between the first antenna and the second antenna.

In yet another embodiment, an apparatus for canceling a coupled input occurring in an antenna system, the antenna system comprising a first antenna and a second antenna. The apparatus comprises a means for generating an amplified output, a means for attenuating the amplified output by a pre-determined attenuating effect, a means for shifting the phase of the attenuated amplified output by a pre-determined phase effect, and a means for combining the phase-shifted attenuated output and an antenna input from one of the first antenna and the second antenna. In one example of the apparatus a value for each of the pre-determined phase effect and the pre-determined attenuation effect are assigned based on system parameters that describe the relationship between the first antenna and the second antenna. In another example of the apparatus the phase-shifted attenuated output cancels the coupled input.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION

In accordance with its major concepts, and broadly stated, the present invention is directed to a device that can be implemented as part of an antenna system such as a cell phone signal booster to prevent oscillation of an amplifier. There is provided in the discussion below, for example, embodiments of an apparatus that can comprise a coupling simulator with pre-determined effects for negating a coupled input exchanged between the antennas of the antenna system. This coupling simulator can be modeled in passive circuitry with elements selected and identified from one or more parameters particular to, and defined by, the construction of the antenna system. These passive elements are useful because the elements, both alone and in one or more combinations, can exhibit properties that in one example can be correlated to the parameters of the antenna system. Such correlation can reduce the number of devices required to eliminate the coupled input, a feature that reduces the cost, size, and complexity of the resulting circuitry.

To facilitate implementation of the coupling simulator and related concepts of the present disclosure, the inventors have identified certain parameters of the structure of antenna systems. These parameters can have associated therewith a quantified value particular to, e.g., the relationship of the antennas in the antenna system. The inventors have found that these quantified values can be modeled in passive circuitry (and elements), which can be coupled to the antenna system to negate the effects of coupling such as oscillation that can result from the proximity and/or orientation of the antennas in the antenna system.

Figure 1:
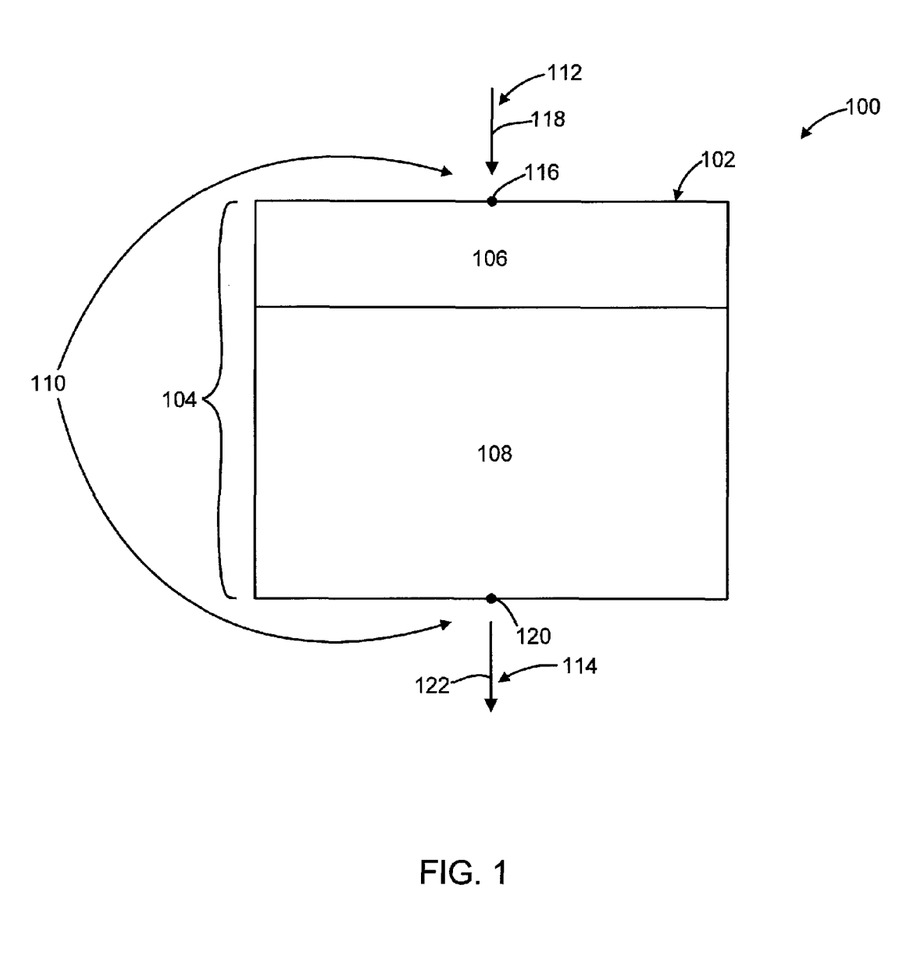
FIG. 1 is a functional schematic diagram of one exemplary embodiment of an apparatus for minimizing amplifier oscillation.

For one exemplary embodiment of an apparatus of the present invention reference can now be had to the functional diagram of an apparatus 100 of FIG. 1. There is shown that the apparatus 100 can comprise a passive circuitry 102 with one or more effective portions 104 such as an attenuating portion 106 and a phase shifting portion 108. The passive circuitry 102 can further comprise a pair of nodes 110 that facilitate reception of inputs 112 and transmission of outputs 114. The nodes 110 can comprise an amplifier input node 116 for receiving a device input 118 and an output node 120 through which is transmitted a device output 122.

The passive circuitry 102 can be configured so that the device output 122 varies from the device input 118 by some pre-determined effect. This effect can comprise, for example, a phase effect in which the phase of the device output 122 is offset from the phase of the device input 118 by 90°, 180°, or some other offset amount. The pre-determined effect can likewise comprise an attenuation effect operative to cause the power level of the device output 122 to vary from the power level of the device input 118. Quantitatively this variation can be shown as an increase, decrease, or even no change as between the power level of the device output 122 the power level of the device input 118.

The pre-determined effect can be modeled as the effective portions 104 of the passive circuitry 102. The term "modeling" is used throughout, with emphasis being particularly directed to its use to describe the selection and/or combination of passive elements for the effective portions 104 such as the attenuating portion 106 and the phase shifting portion 108. By modeling the phase effect and the attenuation effect, for example, the inventors can cause the device output 122 to have certain desired properties, e.g., phase and power level. Moreover, while the desired properties of the device output 122 can reflect variations from the device input 118, these variations can be achieved independent of any properties or characteristics exhibited by the device input 118. Rather in one embodiment each of the attenuating portion 106 and the phase shifting portion 108 have elements selected based on parameters associated (or related to) the system in which the apparatus is deployed.

In one embodiment of the apparatus 100, the elements for the attenuating portion 106 can be selected with properties determined from parameters of the antenna system, some of which can be defined by Equations 1 and 2 below, $$P_{in}^{new} = [P_{in} + G]\eta_1 P_C \eta_2 \quad \text{Equation (1)}$$

$$P_{att} = P_{in}^{new} - P_{in}, \quad \text{Equation (2)}$$

where $P_{in}^{new}$ is a new input power level, $P_{in}$ is an incident power level for the amplifier input, G is a gain assigned to the amplifier, $P_C$ is a coupled power level at a first antenna input, $\eta_1$ is the efficiency of one of the antennas (e.g., the receiving antenna), and $\eta_2$ is the efficiency of the other antenna (e.g., the transmitting antenna). In one example, these equations can be used in connection with calculations for far field antennas. Values for the variables (e.g., $P_{in}^{new}$, $P_{in}$, G, $P_C$, $\eta_1$, and $\eta_2$) can be determined in accordance with measurements and other quantitative methodology such as measurements at a reference point proximate the antennas of the antenna system, an example of which is discussed below.

Figure 2:
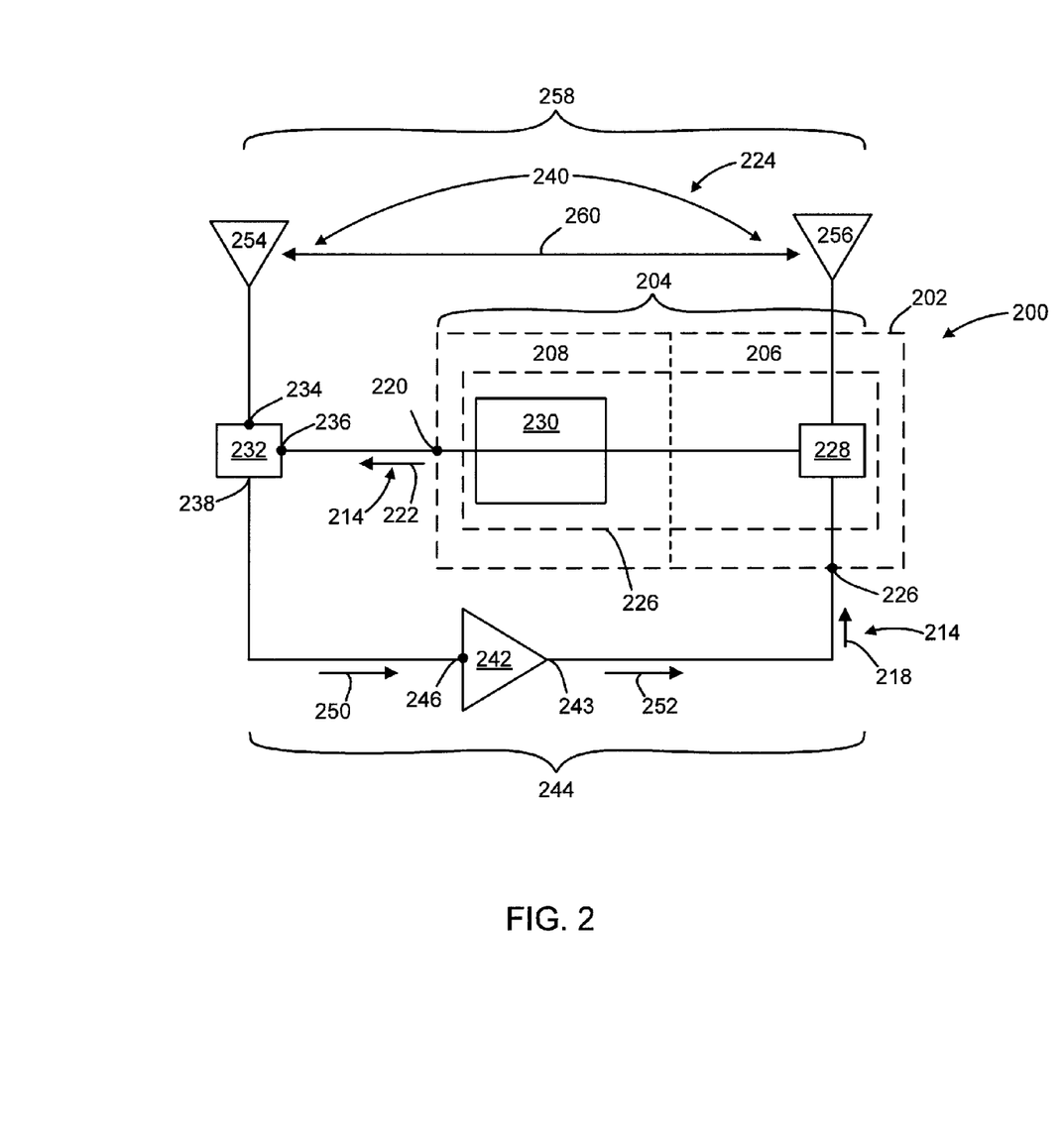
FIG. 2 is a schematic diagram of an antenna system in which is implemented another exemplary embodiment of an apparatus for minimizing amplifier oscillation.

To further illustrate these concepts and features reference is now directed to the exemplary embodiment of an apparatus 200 of FIG. 2, shown as implemented in an antenna system 224 such as a cell phone booster. Noted is the fact that like numerals are used to identify like components as between the FIGS. 1 and 2, as well as the other figures provided in the present disclosure unless cited otherwise. There is shown in FIG. 2, for example, that the apparatus 200 can comprise a passive circuitry 202 with effective portions 204 such as an attenuating portion 206 and a phase shifting portion 208.

In one embodiment, the passive circuitry 202 can comprise a coupling simulator 226 with an attenuating device 228 and a phase shifting device 230. The passive circuitry 202 can also comprise a combining device 232. The combining device 232 can have an antenna node 234, a stabilizing node 236, and a combining node 238, each being configured to receive inputs or permit outputs as discussed herein. Examples of the combining devices for use as the combining device 232 can include, but are not limited to, Wilkinson power dividers, diplexers, duplexers, and the like.

By way of non-limiting example, the antenna system 224 can comprise antennas 240, an amplifier 242, and a signal path 244 such as coaxial cable, optical fiber, or similar conducting material and devices for conducting inputs and outputs as among and between the various components of the passive circuitry 202 and the antenna system 224. The amplifier 242 can comprise an amplifier input node 246 and an amplifier output node 248 configured for, respectively, receiving an amplifier input 250, such as from the combining device 232, and permitting an amplifier output 252 from the amplifier 242. In one implementation of the apparatus 200, the antenna system 224 can further comprise a first antenna 254 and a second antenna 256 positioned relative to the first antenna 254. The relative position can be described by a relationship 258 particular to the type or configuration of the antenna system 224. In one example, the relationship 258 can cause coupling of the antennas 240, resulting in a coupling input 260 such as can occur when outputs from the second antenna 256 are received by the first antenna 254, and vice versa.

To address the issue with coupling, and eliminate or substantially reduce the presence of the coupling input 260 on the signal path 244, the passive circuitry 202 can comprise passive elements utilized alone or in combination as one or more of the attenuating device 228 and the phase shifting device 230. The attenuating device 228, for example, can comprise one or more resistors, couplers (e.g., a directional coupler, power divider), or other passive device operative for modeling one or more of the pre-determined effects such as the pre-determined attenuation effect. Passive elements for use in the phase shifting device 230 can comprise inductors (e.g., ferrite inductors), microstrip and related printed circuit board ("PCB") components, stripline networks, and coaxial line, among many others. The passive elements of the phase shifting device 230 can also model the pre-determined effects, and in one particular construction of the passive circuitry 202 the passive elements model the pre-determined phase effect.

Each of these passive elements can exhibit element properties. These element properties can be fixed values such as the resistance of the resistor. In other examples, one or more of the passive elements, the attenuating device 228, and the phase-shifting device 230 can have element properties that are adjustable or tunable within, e.g., a range of values. Unlike active circuits, however, the element properties of the passive elements identified and described herein are responsive to stimuli only within the natural (or physical) characteristics inherent to the construction and utilization of the element itself. While certain passive elements are so constructed to permit the values to be adjusted within this range, the actual value that the passive element exhibits during operation is functionally consistent with its inherent physical properties. In opposition, active circuits, and particularly the active circuit elements, can have values that are particularly assigned to the active circuit element such as by a microprocessor executing an algorithm, e.g., implemented as firmware and/or software, that determines and selects the particular value.

As discussed above, the passive elements and their combination can be selected to cause the device output 222 to exhibit certain output properties. For example, and in one embodiment, the apparatus 200 can implement passive elements for one or both of the attenuating device 228 and the phase shifting device 230 so that the device output 222 has properties that, when combined with inputs from the first antenna 254 in the combining device 232, the amplifier input 250 exhibits little, if any, properties consistent with the coupling input 260. This feature can be achieved, e.g., by relating the output properties to one or more parameters of the relationship 258. In one example, the parameters can be measured such as at a reference point proximate the first antenna 254 or the second antenna 256. These measurements can indicate the amount of coupling between the two antennas, and in one particular construction the measurements can establish the amplitude, power level, and phase of the coupling input 260.

This data can be analyzed to determine the type, size, and configuration of passive elements that are required to cause the device input 222 to effectively cancel the coupling input 260 such as when the two signals are combined in the combining device 232.

Figure 3:
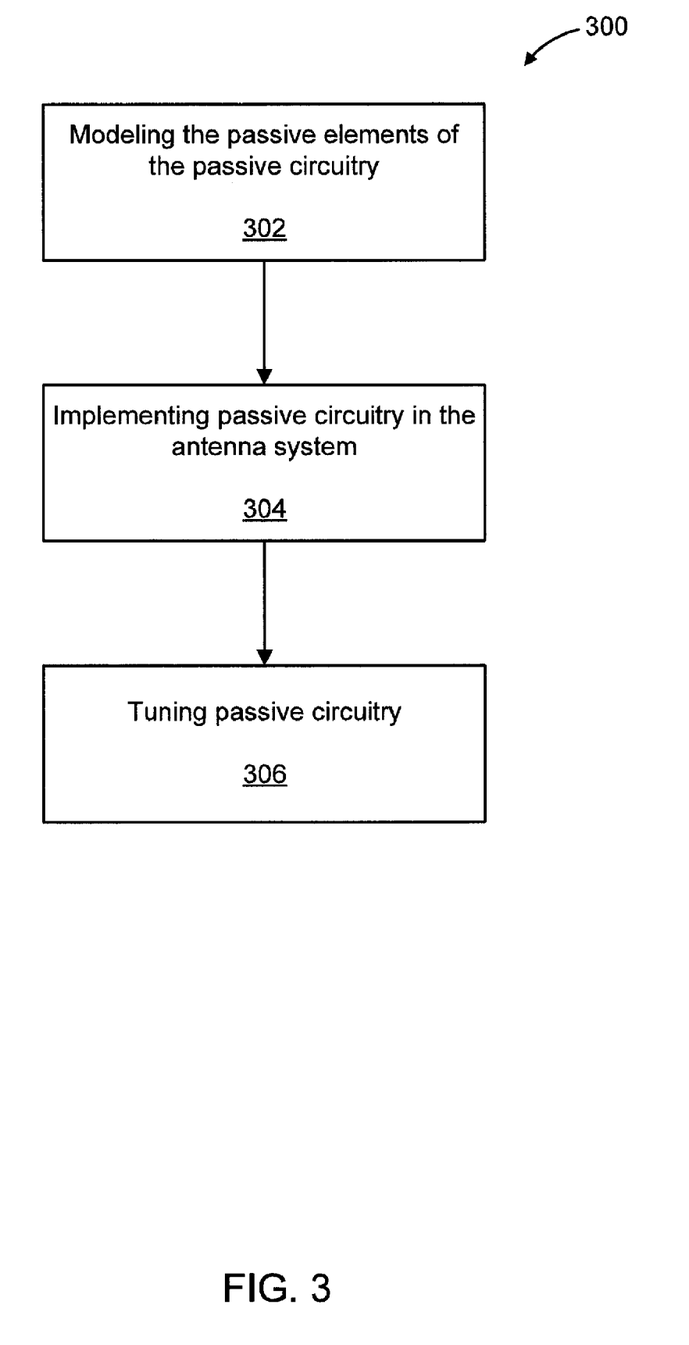
FIG. 3 is a flow diagram of an example of a method for implementing an apparatus for minimizing amplifier oscillation.

Implementation of these concepts to configure passive elements for use in apparatus such as the apparatus 100, 200 discussed above can be further understood with reference to the example of a method 300 of FIG. 3. The method 300 describes at a relatively high level the steps that can be utilized to remove, block, or otherwise substantially reduce coupling antenna systems such as the antenna system 224 above. There is shown in FIG. 3 that the method 300 can comprise steps 302-306 variously, wherein the method 300 can comprise, at step 302, modeling the passive elements of the passive circuitry and, at step 304, implementing the modeled passive circuitry in an antenna system. The method 300 can also comprise, at step 306, tuning the passive circuitry to the antenna system.

Modeling the passive circuitry can be accomplished as illustrated and described herein. In one embodiment of the method 300, the target antenna system can be interrogated to cause or generate the coupling input between the antennas. This coupling input can be measured to quantify the characteristics of the coupling input. These quantified characteristics can then be used to identify certain passive elements, the combination of which will cause the device output to effectively cancel the coupled output.

The resulting circuit thus modeled can be implemented as part of the antenna system. This implementation can incorporate the passive circuitry into the existing circuitry of the antenna system. Performing such integration can require that the antenna system such as the circuitry exclusive to the antenna system is modified to accommodate the passive circuitry. Generally these modifications can couple the passive circuitry to the antennas and amplifier of the antenna system.

Further tuning and refining of the passive circuitry so that the device output is properly provided can likewise occur after the passive circuit is coupled to the antenna system. This tuning can result from physical modifications to the passive circuit such as the addition, subtraction, or modification of the passive elements on, e.g., a PCB. In other examples, the passive circuit can be provided with a switch, knob, or other device that can be utilized to modify the devices output (e.g., the device output 122, 222).

Figure 4:
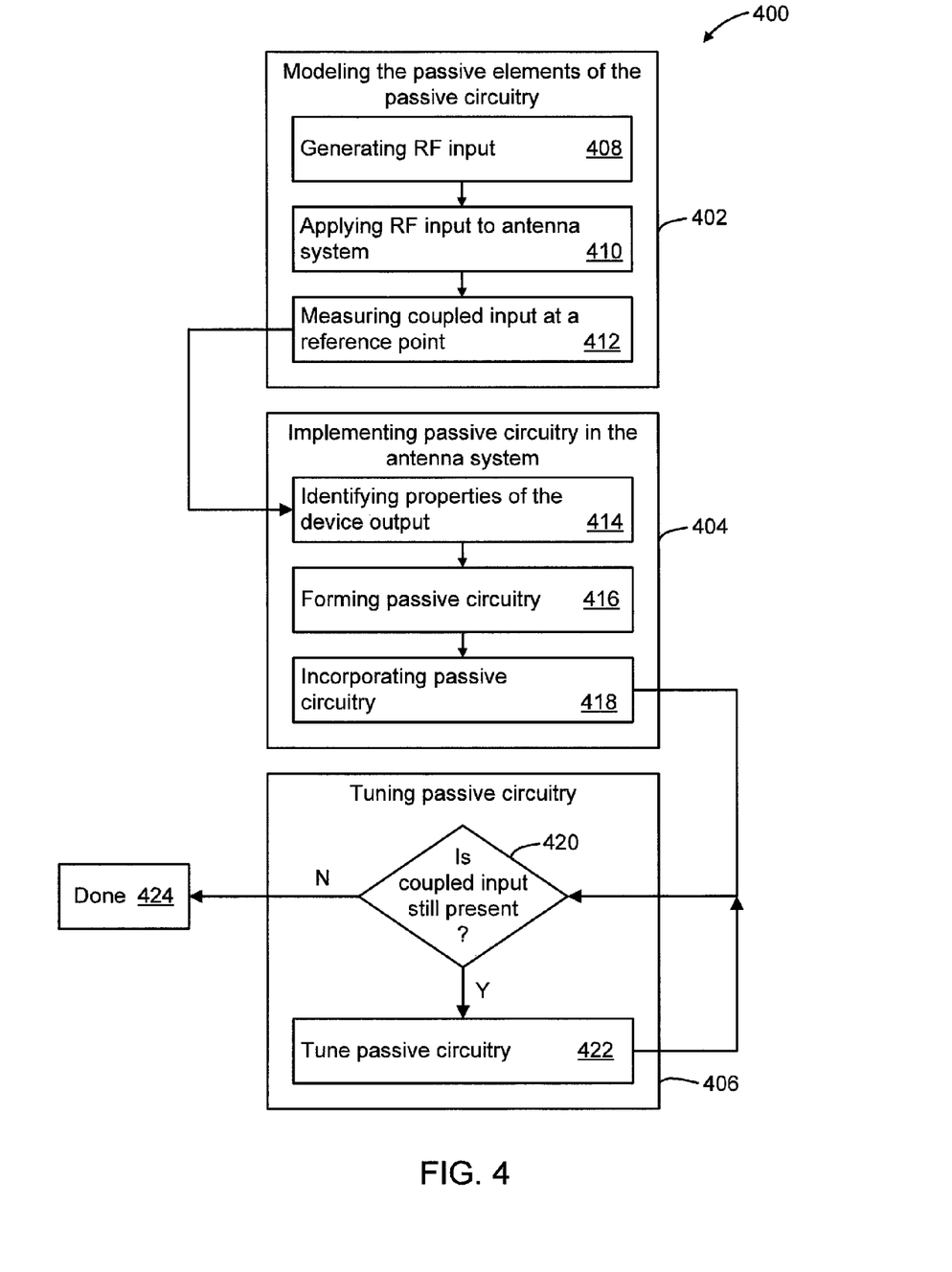
FIG. 4 is a flow diagram of another example of a method for implementing an apparatus for minimizing amplifier oscillation.

For a more detailed example for implementing passive circuitry to prevent oscillation of the amplifier in antenna systems, reference can now be had to the example of a method 400 of FIG. 4. As discussed in connection with the method 300 above, the method 400 can comprise, at step 402, modeling the passive elements of the passive circuitry; at step 404, implementing the modeled passive circuitry in an antenna system; and, at step 306, tuning the passive circuitry to the antenna system. The method can further comprise steps 408-420, which illustrate in exemplary detail additional steps useful or beneficial to the implementation and utilization of the passive circuitry disclosed herein.

The method 400 can comprise, for example, at step 408, generating an RF input, at step 410, applying the RF input to the antenna system, and at step 412, measuring the coupled input at a reference point on the antenna system. The method 400 can also comprise at step 414, identifying properties of the device output from the measured characteristics of the coupled input, and at step 416, forming the passive circuitry to generate the device output with the identified properties. The method can further comprise at step 418, incorporating the passive circuitry into the antenna system; at step 420, determining if the properties of the device output eliminate or reduce the coupled input below, e.g., a threshold level; and, at step 422, tuning the passive circuitry to change the properties of the device output.

As depicted in the FIG. 4 and mentioned above, the properties of the device output that is injected into, e.g., the combining device 232 (FIG. 2), can be determined from the coupled input between antennas of the antenna system. By way of non-limiting example, coupling of the antennas can be forced by generating and applying an RF input to one of the antennas. The coupled input that results can be measured, and for the methodology outlined in FIG. 4 this measurement can occur at a reference point in the antenna system. This reference point can be arbitrarily selected on the signal path between the antennas, but one desirable location for the reference point can be between the receiving antenna and the amplifier. This location permits measurement of the characteristics (e.g., amplitude, frequency, power level, and phase) of the coupled input prior to amplifier.

These characteristics can be used to identify the properties desired for the device output such as properties that will cancel or otherwise negate the coupled input within the signal path. Passive elements can then be selected to form the passive circuitry in which the device input exhibits these particular properties. Singular elements (e.g., singular resistors), as well as combinations of elements (e.g., resistor networks) can be used to cause the device output.

In one example, the passive circuitry modeled and incorporated into the antenna can be examined to determine the effectiveness of the device output. This can be accomplished with measurements at the reference, described and identified above, or by using alternative techniques that can identify the coupled input and/or the characteristic of the coupled input on, e.g., the signal path 244 (FIG. 2) after the combining device 232 (FIG. 2). The presence of the coupled input can be determined using a threshold value, where in one example of the method 400 the amplitude, power level, or related characteristic of the coupled input is compared to the threshold value.

Continued presence of the coupled input despite the incorporation of the passive circuitry into the antenna system can be remedied by adjusting the properties of the passive circuitry. These adjustments can include tuning the passive circuitry, and/or individual passive elements of the passive circuitry, to change the properties of the device output. The changes in the properties, however, can occur independently of other inputs and outputs found in the antenna system. That is, and unlike active circuits, the properties of the device output can be modified in a manner that does not require interaction with, communication with, or information from portions of the antenna system downstream of the reference point.

Figure 5:
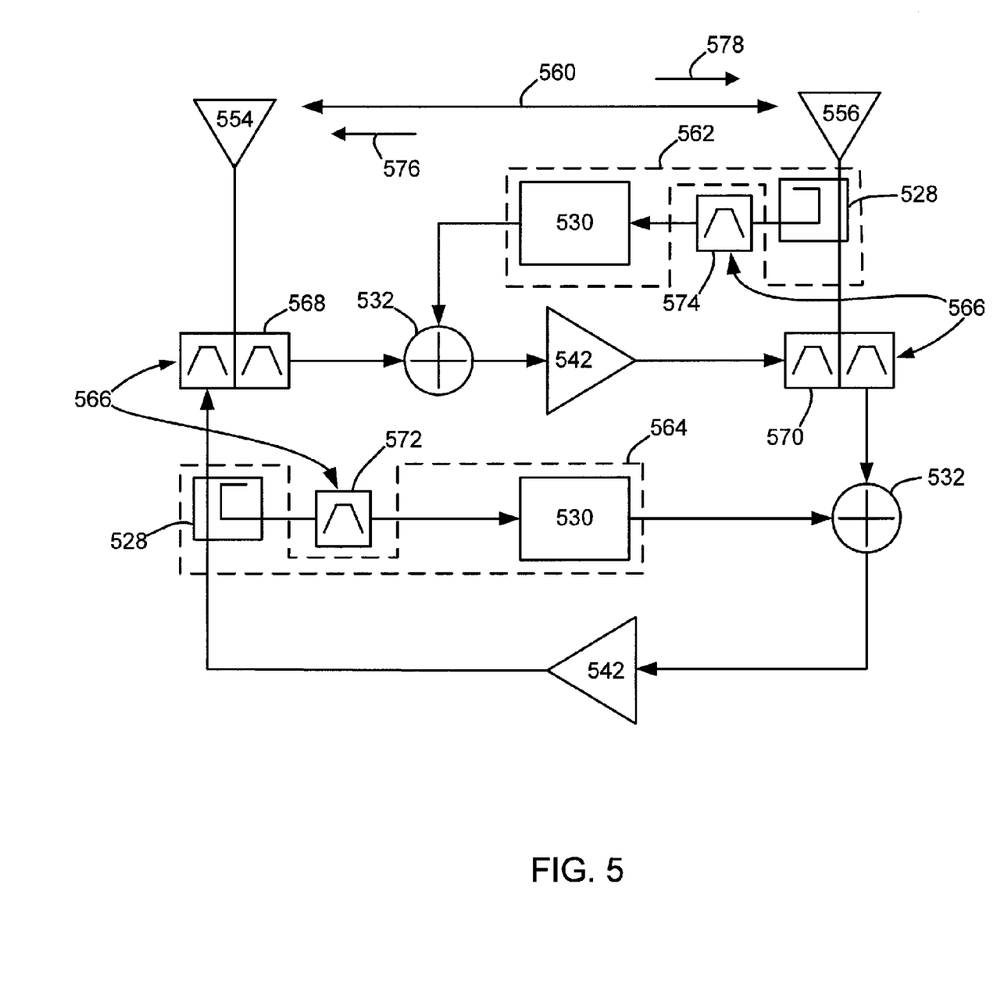
FIG. 5 is a schematic diagram of an example of an antenna system in which is implemented yet another exemplary embodiment of an apparatus for minimizing amplifier oscillation.

Concepts of the present invention are further illustrated in the exemplary embodiment of an apparatus 500 that is illustrated in FIG. 5 and discussed below. Features similar to the features discussed in connection with FIGS. 1 and 2 are also found in the FIG. 5. Therefore positive recitation and/or discussion of these features will not be provided unless necessary to convey one or more concepts of the present invention.

Turning to the apparatus 500, there is shown in FIG. 5 that the apparatus 500 can comprise passive circuitry 502, which in this embodiment can comprise a first passive circuitry 562 and a second passive circuitry 564. The antenna system 524 can further comprise filter devices 566 such as a first diplexer 568, a second diplexer 570, a first filter 572, and a second filter 574. Moreover, consistent with one exemplary operation of the antenna system 524, there is also shown in FIG. 5 that the coupling input 560 can comprise both a first coupling input 576 and a second coupling input 578.

Discussing at a relatively high level the operation of apparatus 500, there is provided in this embodiment accommodation for situations where coupling between the antennas occurs in both directions. For example, the first coupling input 576 can occur directionally as originating from the second antenna 556 to the first antenna 554. The second coupling input 578 can likewise occur directionally as originating from the first antenna 554 to the second antenna 556. The filter devices 566 are provided to filter one or more particular inputs and outputs, wherein the filtering is directional, or in other word is consistent with the direction of the inputs and outputs in the antenna system. Operation of devices for use as the filtering devices is known, as is the implementation of such devices in antenna systems such as the antenna system 524.

The first passive circuitry 562 and the second passive circuitry 564 ("the multiple passive circuitry") can comprise one or more of the components, elements, features, and concepts discussed in connection with the FIGS. 1-4 above. The multiple passive circuitry can be incorporated together in the apparatus 500 as a single combination of passive elements. Alternative constructions are also permissible in which each of the first passive circuitry 562 and the second passive circuitry 564 are provided separately from the other.

In view of the foregoing, there is described above certain embodiments of apparatus (e.g., apparatus 100, 200, 500) for preventing oscillation of an amplifier in antenna systems. Features of these apparatus can be applied to antenna systems in which coupling occurs in one direction (see, e.g., FIG. 2), as well as conditions in which coupling is bi-direction (see, FIG. 5). In either case, as well as other cases that fall within the scope and spirit of this disclosure, the passive circuitry provided alleviates the issues with coupling by, in at least one embodiment, injecting the devices output with certain properties into the antenna system.

It is contemplated that numerical values, as well as other values that are recited herein are modified by the term "about," whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. An apparatus for preventing oscillation of an amplifier by a coupled input between a first antenna and a second antenna in an antenna system, the amplifier generating an amplifier output, said apparatus comprising:

a coupling simulator coupled to the amplifier to receive the amplified output, the coupling simulator generating a coupling simulator output having properties varying from output properties of the amplifier output by a predetermined phase effect and a predetermined attenuation effect;

a combining device coupled to the coupling simulator to receive the coupling simulator output, the combining device generating an amplifier input comprising the coupling simulator output; and a filter device coupled to each of the first antenna and the second antenna, wherein the amplifier output comprises a first amplifier output and a second amplifier output, one each directed to the first antenna and the second antenna, and wherein the coupling simulator generates the device output for each of the first amplifier output and the second amplifier output, wherein a value for each of the pre-determined phase effect and the pre-determined attenuation effect are assigned based on system parameters that describe the relationship between the first antenna and the second antenna.

2. An apparatus according to claim 1, wherein the system parameters comprise an RF power measurement of the coupled input.

3. An apparatus according to claim 2, wherein the properties of the coupling simulator output comprise a coupling power that is the same as the RF power measurement.

4. An apparatus according to claim 1, wherein the pre-determined phase effect causes a phase shift of the coupling simulator output that is inversely proportional to the phase of one of either the first or the second amplifier output.

5. An apparatus according to claim 1, wherein the coupling simulator comprises a phase shifting device and an attenuating device selected so that the coupling simulator output cancels the coupled input at the combining device.

6. An apparatus according to claim 5, wherein the coupling simulator comprises a tunable device coupled to one or more of the phase shifting device and the attenuating device, and wherein the tunable device can change one or more of the pre-determined phase effect and the pre-determined attenuation effect independent of the output properties of one of either the first or the second amplifier output.

7. An apparatus according to claim 1, wherein the coupling simulator comprises one or more of a ferrite inductor, a microstrip, and a stripline network.

8. An apparatus according to claim 1, wherein the combining device comprises a Wilkinson Power Divider.

9. An apparatus for canceling a coupled input occurring between a first antenna and a second antenna, said apparatus comprising:

a filter device coupled to each of the first antenna and the second antenna;

an amplifier for generating a first amplifier output and a second amplifier output, one each directed to the first antenna and the second antenna;

a coupling simulator coupled to the amplifier, the coupling simulator generating a first and a second coupling simulator output;

a first and a second combining device, wherein each of the first and the second combining devices combine one of the first and the second coupling simulator outputs with an antenna input from one of the first antenna and the second antenna, wherein the properties of at least one of the first and the second coupling simulator outputs are caused by an attenuating device for sampling the amplifier output and a phase shifting device coupled to the attenuating device, wherein the attenuating device exhibits a pre-determined attenuating effect, wherein the phase shifting device exhibits a pre-determined phase effect, and wherein a value for each of the pre-determined phase effect and the pre-determined attenuation effect are assigned based on system parameters that describe the relationship between the first antenna and the second antenna.

10. An apparatus according to claim 9, further comprising a diplexer for receiving the antenna input from each of the first antenna and the second antenna, wherein each of the diplexers are operatively configured to pass the antenna input to one of the first and the second combining device.

11. An apparatus according to claim 9, wherein the attenuating device comprises at least one resistor.

12. An apparatus according to claim 9, wherein the phase shifting device comprises one or more printed circuit board components.

13. An apparatus for canceling a coupled input occurring in an antenna system, the antenna system comprising a first antenna and a second antenna, said apparatus comprising a means for generating a first and a second amplified output;

a means for attenuating one of the first and the second amplified output by a pre-determined attenuating effect; and a means for shifting the phase of the attenuated amplified output by a pre-determined phase effect; and a means for combining the phase-shifted attenuated output and an antenna input from one of the first antenna and the second antenna, wherein a value for each of the pre-determined phase effect and the pre-determined attenuation effect are assigned based on system parameters that describe the relationship between the first antenna and the second antenna, and wherein the phase-shifted attenuated output cancels the coupled input.

14. An apparatus according to claim 13, wherein the system parameters comprise an RF power measurement of the coupled input.

15. An apparatus according to claim 13, wherein the properties of the coupling simulator output comprise a coupling power that is the same as the RF power measurement.

16. An apparatus according to claim 13, wherein the pre-determined phase effect causes a phase shift at least about 180°.

* * * * *